United States Patent [19]

Pfenninger et al.

[11] Patent Number: 5,229,515
[45] Date of Patent: Jul. 20, 1993

[54] PROCESS FOR PREPARING MODIFIED β-QUINACRIDONE PIGMENT

[75] Inventors: Johannes Pfenninger, Rechthalten, Switzerland; Walter C. Zukowski, Wilmington, Del.; Fridolin Bäbler, Hockessin, Del.; Edward E. Jaffe, Wilmington, Del.

[73] Assignee: Ciba-Geigy Corporation, Ardsley, N.Y.

[21] Appl. No.: 712,016

[22] Filed: Jun. 7, 1991

[51] Int. Cl.⁵ .............................................. C09B 48/00
[52] U.S. Cl. .................................................... 546/49
[58] Field of Search ........................................ 546/49

[56] References Cited

U.S. PATENT DOCUMENTS

| | | |
|---|---|---|
| 2,844,484 | 7/1958 | Reidinger et al. |
| 2,844,485 | 7/1958 | Struve. |
| 2,844,581 | 7/1958 | Manger et al. ............ 546/49 |
| 2,969,366 | 1/1961 | Griswold et al. ........... 546/49 |
| 3,148,075 | 9/1964 | Ehrich ....................... 546/49 |
| 3,287,457 | 11/1966 | Higgins ....................... 546/49 |
| 4,024,148 | 5/1977 | Tyson ......................... 546/49 |
| 4,760,144 | 7/1988 | Jaffe .......................... 546/49 |
| 4,801,702 | 1/1989 | Babler ........................ 546/49 |
| 4,857,646 | 8/1989 | Jaffe .......................... 546/49 |
| 4,895,949 | 1/1990 | Jaffe .......................... 546/49 |
| 5,093,497 | 3/1992 | Schütze et al. .............. 546/49 |

FOREIGN PATENT DOCUMENTS 0027959 2/1984 Japan ........................................ 546/49

OTHER PUBLICATIONS

Denison et al., "Bead Milling–A Practical Guide" Milling, presented at the New Castle Section Seminar, Paint Manufacture: 24 Apr. 1990, Durham University.
Schuetze et al. Chem. Abstr. vol. 113 Entry 154271c Abstract German 3834748 (1990).

Primary Examiner—Donald G. Daus
Attorney, Agent, or Firm—Marla J. Mathias; George R. Dohmann

[57] ABSTRACT

A process for preparing a modified beta quinacridone polytype having identified color space values which comprises the steps of dry pre-milling beta phase quinacridone, deaggregating the pre-milled product in an alcohol-base medium and ripening the deaggregated product in the presence of an oxidizing agent.

10 Claims, No Drawings

PROCESS FOR PREPARING MODIFIED β-QUINACRIDONE PIGMENT

Quinacridone, also referred to as 5,12-dihydroquino[2,3-b]acridine-7,14-dione, of the following formula

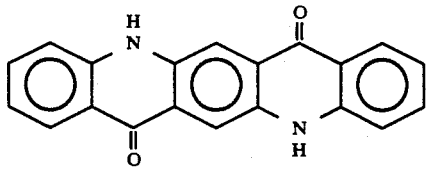

is known to exist in three polymorphic modifications. The alpha (U.S. Pat. No. 2,844,484) and gamma (U.S. Pat. Nos. 2,844,581 and 2,969,366) forms are bluish-red pigments, while the beta form (U.S. Pat. No. 2,844,485) is a violet pigment.

A second, distinct beta quinacridone polytype designated $\beta_{II}$ was identified and described in U.S. Pat. No. 4,857,646. The new form differs from the known beta form by a modified X-ray diffraction pattern and a significant color shift from violet to magenta. The new form also offers a variety of new color styling opportunities, particularly for automotive and industrial finishes. The pigment additionally shows excellent hiding power, purity of shade, fastness to light and weathering, resistance to high temperatures and solvent and softener resistance.

Several methods were identified for preparing the new pigment and for preparing it in the desired relatively low specific surface area form. The new pigment could be prepared either by controlled particle size reduction/ripening of a crude pigment or by overmilling of a crude and then growing the pigment particles to the desired size and surface area. It was also noted that both particle size reduction and growth by crystallization could be achieved in a single operation.

Applicable disclosed procedures can be summarized as follows:

(1) Milling of alpha quinacridone, preferably of small particle size, in the presence of alcohol and base.

(2) Milling of crude or large particle size $\beta_{II}$ quinacridone (surface area of 3–8 m$^2$/g) in the presence of alcohol and base and appropriate milling media.

(3) Conducting the second procedure in two steps with premilling of the crude beta quinacridone following by ripening or particle size growth in a subsequent alcohol-base milling step.

(4) Particle ripening of a finished, particle size reduced beta quinacridone (a) by milling in the presence of alcohol and base, or (b) refluxing in basified alcohol.

Further experimentation with the new beta polytype revealed that it could exhibit a greater breadth of masstone color within the magenta class. Thus, in terms of C.I.E. coordinates with L, A, B color space units, the modified form disclosed in U.S. Pat. No. 4,857,646 exhibited L (lightness)=35.2 units, A (chroma)=38.0 units, B (hue)=10.9 units when incorporated into a high solid enamel paint system. It has now been determined that each of the L, A, B coordinates can be defined in terms of a range of values.

Accordingly, the instant invention relates to a new process for preparing the new beta polytype quinacridone which upon incorporation in a paint, such as commercial high solids enamel, manifests the indicated range of numerical values based on C.I.E. coordinates, showing high saturation or brightness and opacity with optimum pigmentary properties. The new beta polytype with this defined range of color values is more fully described and claimed in copending application Ser. No. 711,787, filed Jun. 7, 1991.

The new process involves the premilling of crude β-quinacridone in a grinding apparatus, deaggregation of the premilled powder in an alcohol-base medium in a mill and the ripening of the deaggregated pigment in the presence of an oxidizing agent for a defined period of time.

Premilling refers to milling in the complete absence of liquids, or if liquids are present, such as a phase directing solvent or a surface active agent, they are present in small amounts such that the pigment retains powder characteristics. The initial step of premilling of the crude β-quinacridone can be carried out neat or in the presence of 10 to 30%, by weight, of an inorganic salt such as NaCl, CaCl$_2$, Na$_2$SO$_4$ or Al$_2$(SO$_4$)$_3$, with or without water of hydration. The preferred milling mixture composition comprises, by weight, 75 to 85% crude and 15 to 25% anhydrous Na$_2$SO$_4$. The salt functions primarily as a suppressant of potential explosivity of the resulting millpowder. The premilling can be conducted with known grinding apparatuses such as a ball mill or an attritor mill. A variety of milling media can be used such as metal or porcelian balls, preferably ceramic beads or stainless steel balls, nails or shot. The premilling can be controlled by assessing the width at half height of the 5.9°2Θ double glancing angle band. The greater the width, the smaller the particle size of the premilled pigment powder. Thus, the preferred particle size reduction leading to sufficient activation of the premilled powder increases the width of the band at half height from 0.23–0.26 2Θ angles to a minimum of 0.3 2Θ angle.

The premilled pigment salt mixture is separated from the grinding media, with removal of any metal that wears off during the milling operation, and suspended in an alcoholic base medium. A variety of alcohols are applicable including low boiling alcohols such as methanol, ethanol, n-propanol, butanol and pentanol, preferably methanol, and glycols such as ethylene glycol. A variety of inorganic or organic bases can be used including alkali metal hydroxides such as sodium hydroxide, potassium hydroxide or lithium hydroxide and quarternary ammonium hydroxides such as benzyltrimethylammonium hydroxide. Sodium and potassium hydroxide are preferred.

The alcohol is generally present in an amount ranging from 5 to 25 times the weight of pigment and preferably 14 to 18 times. The preferred concentration range of base is 1 to 10%, based on the weight of methanol and preferably 2–6%. The preferred concentration of base changes with the nature of the alcohol.

The deaggregation process can also be conducted with a variety of mills and milling media. It is preferably carried out in a horizontal bead mill containing as grinding media metal, glass, ceramic or plastic beads. Ceramic beads are preferred. The pigment suspension is pumped through the agitated beads continuously to achieve the required deaggregation of the premilled powder. The degree of deaggregation can be followed conveniently by looking at samples under the light microscope. When the deaggregation is complete a homogenous suspension is obtained. The deaggregation is conducted at temperatures ranging from 5°–90° C., preferably from 15° to 60° C.

The homogenous pigment suspension is separated from the milling media and then subjected to a ripening process, optionally in the presence of additional alcohol and base, whereby the pigment particles grow to a desired size of above 0.1 μm, preferably in the range 0.2 to 0.8 μm which corresponds approximately to a specific surface area of 9 to 25 m$^2$/g. This dynamic particle ripening permits total form conversion and particle growth to the desired equilibrium size.

It has been surprisingly discovered that when the ripening process is conducted in the presence of oxidizing agents, the time of the ripening process to achieve the desired pigment particle size and form can be reduced compared to the same process conducted under an inert gas atmosphere. Additionally, the saturation or brightness of the produced pigment is significantly higher when an oxidizing agent is present during the pigment ripening step.

Applicable oxidizing agents include organic peroxides such as benzoyl peroxide, hydrogen peroxide, air, or nitrogen/oxygen-mixtures containing at least 5% oxygen. The temperature of the ripening process preferably does not exceed 60° C. The preferred range is 40°–50° C. for a period of 4 to 50 hours. The preferred period is 5–10 hours. The ripening process can be carried out at normal pressure or slightly elevated pressures. At higher pressures, the temperature and time of ripening are reduced in order to obtain the desired pigment particle size and form.

The pigment is isolated by filtration of the alcoholic suspension or by stream distillation of the alcohol, followed by filtration of the resulting aqueous pigment suspension. In both cases, the presscake is washed free of base with water and the presscake dried by conventional drying processes such as spray drying, tray drying or, for example by drying in a LUWA- or VENULETH-dryer.

As previously noted, depending on base concentration, time of ripening and availability of an oxidizing agent, the color, hue and saturation of the isolated product can vary within certain limits. Thus when the pigment is dispersed in a commercial high solids enamel system at 16% pigment concentration, 48% total non-volatiles and a pigment to binder ratio of 0.50, the resulting paint sprayed is applied in pigment to binder ratio of 0.15 to hiding and utilizing known masstone technique (as noted hereinafter) shows the following optical properties when measured on a Hunter Lab Colorquest Spectrophotometer (Hunter Associates Laboratory Inc., Reston, Va. 22090). Using D65 illuminant on C.I.E. lab scale and a 10 degree observer with specular component included, the following range of absolute L,A,B color space values of the masstone are obtained.

| COLOR SPACE | | | |
|---|---|---|---|
| | Broad Range | Preferred Range | Most Preferred Range |
| Lightness (L) | 33–36 | 34–36 | 35–36 |
| Chroma (A) | 34–40 | 36–38 | 36–38 |
| Hue (B) | 08–15 | 09–12 | 9–11 |

If desired, various surfactants, extenders or particle growth inhibitors or promoters can be introduced at the basified alcohol milling (deaggregation) step provided the additives are not inactivated by the basic medium and do not prevent the new magenta beta quinacridone formation. Simple addition of anionic (subject to salt formation), cationic or nonionic surfactants to the liquid milling operation, assuming the materials are not water soluble, will cause them to deposit in a uniform manner on the surface of the pigment during alcohol removal and, consequently, frequently alter the pigment properties. Thus, introduction of as little as 2% isopropyl amine salt of p-dodecylbenzensulfonic acid, based on weight of pigment, produces a product which by rubout in lithographic varnish shows increased masstone yellowness and opacity relative to a product prepared without the surfactant.

Like many other pigments, the product is advantageously surface treated by known methods to improve its performance in a variety of automotive and other finish systems. Additives which serve to lessen or avoid flocculation and increase pigment dispersion stability can be advantageously used with this pigment. When so treated, the pigment shows outstanding performance on its own but particularly as a blending agent for styling of solid reds in a variety of systems but particularly in automotive finishes, such as acrylics, alkyds, polyester and other systems, including waterborne systems. 2-Phthalimidomethylquinacridone, quinacridonesulfonic acids, and/or its metal salts, N-(dialkylaminoalkyl) quinacridone-sulfonamide or other similar derivatives can serve as additive antiflocculating agents. In some systems, the addition of polymer dispersants further improves the performance of this pigment.

Pigmented systems which contain the pigment as a component of mixtures of substances, possibly in addition to other components, include: pastes, flush pastes, preparations, printing colors, distempers, binder colors or lacquers and varnishes of all kinds, such as physically and oxidatively drying lacquers and varnishes, acid, amine and peroxide curing varnishes or polyurethane varnishes. The pigment may also be present in synthetic, semisynthetic or natural macromolecular substances, such as thermoplastic reins, e.g., polyvinyl chloride, polystyrene, polyethylene, polyesters, phenoplasts, aminoplasts and rubber. The pigment may also be present in admixture with natural, regenerated or synthetic fibers, such as glass, silicate, asbestos, wood cellulose, acetylcellulose, polyacrylonitrile, polyester, polyurethane and polyvinyl chloride fibers or mixtures of the same, and also in powders, for example, fillers, organic or inorganic pigments. With the new pigment, there are obtained prints, paint and varnish coatings, coverings, shaped articles, such as sheets, threads, plates, fibers, blocks, granulates and rods with a brilliant red color of excellent durability.

The mixtures of substances which contain as active coloring ingredient the magenta pigment of good hiding power, may be of solid, elastic, pasty, viscous, mobile or thixotropic consistency. They may be obtained by conventional methods. Aqueous pastes may be obtained for example by stirring the pigment into water, possibly with the addition of a wetting or dispersing agent or by stirring or kneading the pigment into a dispersing agent in the presence of water and possibly of organic solvents or oils. These pastes may for example be used for the production of flush pastes, printing colors, distempers, plastic dispersions and spinning solutions. The pigment may also be introduced by stirring, rolling, kneading or grinding into water, organic solvents, non-drying oils, drying oils, lacquers, varnishes, plastics or rubber. Finally, it is also possible to work up the pigment by drying mixing with organic or inorganic masses, granulates, fibrous materials, powders and other pigments, to form mixtures of substances.

In addition to its excellent hiding power, outstanding purity of shade and good general fastness, such as fastness to light and weathering and solvent and migration resistance, the pigment is also characterized by superior resistance to high temperatures. For example, the thermal behavior of the pigment makes it possible to work it into high and low density polyethylene or polypropylene, without the shade of color being dulled by the effect of the temperatures used during work-up.

Notwithstanding that the key aspect of the instant invention is the preparation of the new beta quinacridone modification, it is to be noted that the invention is deemed to include pigment resulting from the above noted process which comprise blends of the new beta quinacridone and minor amounts, i.e. less than about 50%, by weight, of conventional beta quinacridone. The blends exhibit the distinguishing characteristics and the pigmentary properties of the new beta quinacridone modification, although to a somewhat lesser extent.

The following examples further illustrate the embodiments of this invention. In these examples, all parts given are by weight unless otherwise indicated.

EXAMPLE IA

A 1-SDG Attritor mill is charged with 468 grams of beta quinacridone crude and 82.5 grams of anhydrous sodium sulfate. The mill is fitted with L-arms and charged with one gallon of 0.64 cm diameter ceramic grinding media (64.2% $SiO_2$/26.7% MgO/5.8% $Al_2O_3$/1.2% $K_2O$/1.1% $Fe_2O_3$, 7.5 MOH hardness, 60-65 Rockwell 45N hardness, 3.0 kg/cm impact strength, 8500 kg/cm$^2$ compressive strength). The mill is rotated at 500 RPM. At the conclusion of the milling, the batch is recovered by opening the valve at the bottom of the mill while rotation is continued for 15 minutes.

EXAMPLE IB

A flask maintained under an air blanket is charged with 1242 grams methanol and 1670 grams 50% aqueous sodium hydroxide solution. With stirring, 200 grams premilled beta quinacridone pigment obtained in Example IA containing 20% anhydrous sodium sulfate are introduced. The temperature of the mill suspension is 32°-35° C.

The pigment suspension is deaggregated under air by pumping it in one pass in 15 minutes at 20°-25° C. at a stirring speed of 2000 rpm through a KDL DYNO-mill provided with a 600 ml steel chamber filled with 900 grams ceramic beads ranging in size from 1.0 to 2.5 mm diameter and consisting on average of about 69% $ZrO_2$ and 31% $SiO_2$. After completion of the milling cycle, a portion of the slurry remaining in the mill chamber is recovered by displacement with 150 ml methanol.

The deaggregated slurry is diluted with a mixture of 24.5 grams 50% aqueous sodium hydroxide and 220 grams methanol. The pigment suspension is stirred at 45° C. under air for 10 hours and then at reflux for 2 hours. 200 ml water is added and the methanol steam distilled until a temperature of 95° C. is reached in about 70 minutes. The slurry is filtered at 80° C., the presscake washed with hot water to pH 8 and dried at 100° C., yielding 140 grams pigment of the new magenta beta quinacridone modification.

EXAMPLE II

A flask maintained under an inert nitrogen gas flow is charged with 1242 grams methanol and 1670 grams 50% aqueous sodium hydroxide. With stirring, 200 grams premilled beta quinacridone pigment obtained in Example IA containing 20% anhydrous sodium sulfate are introduced. The temperature of the mill suspension is 32°-35° C.

The pigment suspension is deaggregated under inert gas in a manner described in Example IB. After completion of the milling cycle, a portion of the slurry remaining in the mill chamber is recovered by displacement with 150 ml methanol.

The deaggregated slurry is diluted with a mixture of 24.5 grams 50% aqueous sodium hydroxide and 220 grams methanol. Five grams of 30% aqueous hydrogen peroxide are added and the pigment suspension is stirred at 45° C. under nitrogen for 10 hours and then at reflux for 2 hours. 200 ml water is added and the methanol steam distilled until a temperature of 95° C. is reached in 70 minutes. The slurry is filtered at 80° C., the presscake washed with hot water to pH 8 and dried at 100° C., yielding 140 grams of the new magenta beta quinacridone modification.

EXAMPLE III

The procedure of Example II is repeated with the exception that aqueous hydrogen peroxide is omitted. A beta quinacridone pigment is obtained showing a significantly duller and more transparent masstone and a stronger tint when applied in a varnish system versus the product of Example II. The undesirable characteristics are attributable to inadequate particle growth.

EXAMPLE IV

The coloristic properties of the pigments obtained in Examples IB, II and III are also determined by rubout, conducted according to the ASTM-method D-387-60. More specifically, tinctorial qualities are determined utilizing rubouts in lithographic varnish prepared with a Hoover Muller. The apparatus is equipped with a ½ HP 110-220 V, 60 cycle motor and two glass plates. The Muller can be adjusted to stop after 25, 50, 75, or 100 revolutions with 50 revolutions being considered normal. Three weights are used which apply 150 pounds pressure between the plates. In each case, 0.6 parts of dry pigment and 1.2 parts of a lithographic varnish drier are mixed with a spatula on the lower glass plate. The upper plate is locked to the lower plate and the motor is set to stop after fifty revolutions. The plates are separated and the pigment in ink dispersion is picked up and spread out again on the lower plate and the operation repeated six more times. The resulting pigment is an ink dispersion, referred to as the masstone ink, is drawn down versus an appropriate control prepared in the identical manner. In order to assess color strengths of the samples, calculated amounts of the masstone ink (0.18 parts) and a zinc oxide paste dispersion (10 parts) are weighed accurately and mixed with a spatula on a polished glass plate. The resulting extensions, referred to as tints, are drawn down versus an appropriate control prepared in an identical manner.

Using a color spectrophotometer with D-65 illuminant, C.I.E. lab scale and 10 degree observer with specular component included, the L,A,B color space values of masstone as well as tint rubouts are measured. In addition, the total color difference values (Delta E) are determined using the value of Example IB as a reference:

|  | Masstone | | | | Tint | | | |
| --- | --- | --- | --- | --- | --- | --- | --- | --- |
|  | L | A | B | ΔE | L | A | B | ΔE |
| Example IB | 35.0 | 36.0 | 9.6 | — | 60.1 | 27.8 | −10.2 | — |
| Example II | 35.0 | 36.1 | 9.9 | 0.1 | 60.0 | 27.7 | −10.1 | 0.1 |
| Example III | 34.7 | 38.5 | 8.5 | 2.7 | 59.3 | 28.5 | −11.4 | 1.6 |

The major appearance change (ΔE) is due to a hue shift where products of Example IB and II are yellower than that of Example III. Masstone B values are more positive by 1.1 and 1.4 units for products of Examples IB and II vs. III. There is also a lightness difference in both masstone and tint where Example III is darker. In addition, the A values for the masstones are 2.5 and 2.4 units lower for pigments of Examples IB and II respectively vs. the product of Example III. Thus, according to the present invention, the desired coloristic benefits of the Examples prepared in the presence of an oxidizing agent during the pigment ripening process are established.

EXAMPLE V

The procedure described in Example IB is repeated conducting the experiment under a flow of a gas mixture containing 7% oxygen and 93% nitrogen to yield the new magenta beta quinacridone.

EXAMPLE VI

A flask, under an air blanket, is charged with 660 grams ethanol and 47 grams 50% aqueous sodium hydroxide solution. With stirring, 120 grams premilled beta quinacridone obtained in Example IA containing 20% anhydrous sodium sulfate are introduced.

The pigment suspension is deaggregated in a Dyno mill under air according to the procedure described in Example IB, with the exception that 150 ml ethanol are used to recover a part of the pigment slurry instead of the methanol.

526 grams of the deaggregated slurry are diluted with 300 ml ethanol and stirred for 50 hours at 45° C. under air. The pigment is isolated by filtration, followed by washing with methanol and water to a pH of 8.00 and dried at 100° C.

The coloristic properties of the resulting pigment are determined by rubout prepared according to the ASTM-method D-387-60 and the L,A,B color space values of the masstone are measured as described in Example IV, with the following data:

$(L) = 35.35; (A) = 38.66; (B) = 13.07$

It is seen that the product of this example is significantly more yellow than the product of Example 1B (difference in B value of 2.47 units) and shows the wide range of color space achievable through use of the process of the present invention.

EXAMPLE VII

This example illustrates the incorporation of the new beta quinacridone modification into high solids enamels.
Pigment Dispersion Formulation A 0.26 liter jar is charged with 42.2 grams of the pigment prepared according to Example IB, 1.3 grams of anti-flocculating agent, 2.6 grams of a polymeric dispersant, 66.0 grams of acrylic resin, 52.8 grams of xylene and 980 grams of 4 mm diameter steel diagonal rods. The mixture is milled in the jar for 64 hours on a roller mill. The dispersion contains 28% pigment and 56% solids at a pigment to binder ratio of 1.0.

Catalyst and Stabilizer Solution Formation

A 4.2 liter jar fitted with an impeller stirrer is charged with 755 grams butanol, 1117 grams UV-screener solution (contains benzotriazole UV absorber TINUVIN 1130 from CIBA-GEIGY Corp.) and 47.9 grams of a solution of n-propylamine in xylene/methanol/butanol. A mixture of 34.8 grams methanol and 113.8 grams dodecyl benzenesulfonic acid is added and the resulting solution is stirred for 20 minutes.

Paint Formulation 36.2 grams of above described pigment dispersion, 39.6 grams of acrylic resin, 28.4 grams of melamine resin and 20.8 grams of catalyst and stabilizer solution are mixed and diluted with xylene to a spray viscosity of 28 seconds using No. 4 FORD cup at 25° C. The paint (masstone) is sprayed onto a primed aluminum panel, exposed to ambient air for 10 minutes and stoved for 30 minutes at 130° C.

The resultant masstone colored coating exhibits excellent weatherability and high chroma (determined by a Colorquest Spectrophotometer). Coatings using a commercial beta type quinacridone are prepared in a similar manner. The color characterized by the following instrumental L,A,B color space values is compared with the magenta color coatings of the new beta quinacridone modification prepared according to Example V.

| Coating containing: | L | A | B |
| --- | --- | --- | --- |
| β-I-type (Example V) | 35.2 | 38.0 | 10.9 |
| β-II-type (MONASTRAL Violet RT-301-D from Ciba-Geigy Corp.) | 29.8 | 22.2 | 3.4 |

The above data demonstrate the large color shade difference of the new beta modification versus the commercial beta type quinacridone.

EXAMPLE VIII

To further demonstrate the styling opportunities in the field of automotive finishes, the new beta modification is compared versus the known violet beta type quinacridone pigment in a mixture with the diketopyrrolopyrrole (DPP) pigment, C.I, Pigment Red 254 from Ciba-Geigy Corp.

Thus, blends are prepared consisting of 70% IRGAZIN DPP Red BO (C.I. Pigment Red 254) and (1) 30% new magenta beta quinacridone modification prepared according Example IB and (2) 30% commercially available beta quinacridone MONASTRAL Violet RT-301-D (Ciba-Geigy Corp.) respectively.

Each blend is incorporated into a high solids enamel system as described in Example VI and the color of the obtained coatings is again measured and expressed in L,A,B color space values:

| Coatings | L | A | B |
| --- | --- | --- | --- |
| (1) | 38.7 | 45.3 | 21.8 |
| (2) | 34.3 | 35.3 | 14.1 |

Coating (1) containing the new magenta beta modification according to the present invention is yellower as evidenced by the more positive B values (7.7 units) and much lighter as evidenced by the more positive L values (4.4 units). In addition, (1) is also much higher in chroma as shown by the A color space values (10.0 units).

EXAMPLE IX

This example illustrates the incorporation of the new beta quinacridone modification into a plastic system.

A Banbury mixer is charged with 1000 grams high density polyethylene MA-778, (from QUANTUM CHEMICALS), 5 grams new magenta beta quinacridone obtained in Example II, 2.5 grams CHIMASORB 944 LD (hindered amine light stabilizer), 1.0 gram TINUVIN 328 (UV absorber) 1.0 gram IRGANOX 1010 (antioxidant) and 1.0 gram IRGAFOS 168 (phosphite process stabilizer), all additives being products of Ciba-Geigy Corp., and mixed at a speed of 175-200 rpm and a total residence time of approximately three minutes. The fluxed pigment resin is chopped up while warm and malleable, and then fed through a granulator.

The obtained granules are molded on a BATTENFELD 1000 injection molder with a five minute dwell-time and one 30-second cycle time at a temperature of 280° C. yielding magenta colored chips with excellent light and heat resistance.

Summarizing, it is seen that this invention provides a new process for the preparation of a new beta quinacridone pigment form having a range of color space values. Variations may be made in proportions, procedures and materials without departing from the scope of the invention as defined by the following claims.

What is claimed is:

1. A process for preparing a magenta beta crystal phase quinacridone having C.I.E. values in the masstone of L=33-36, A=34-40 and B=8-15, which comprises the steps of dry premilling crude beta phase quinacridone, milling the premilled quinacridone in a horizontal bead mill open to the atmosphere in the presence of effective phase converting amounts of an alcohol selected from the group consisting of methanol, ethanol, n-propanol, butanol, pentanol and ethylene glycol and a base selected from the group consisting of NaOH and KOH, wherein said alcohol is present in an amount ranging from 5 to 25 times the weight of said quinacridone and said base is present in an amount ranging from 1.0 to 10.0% by weight of said alcohol, to produce a particle size reduced pigment slurry and simultaneously and/or thereafter exposing the milled pigment slurry to an oxidizing agent selected from the group consisting of benzoyl peroxide, hydrogen peroxide, air and nitrogen/oxygen-mixtures containing at least 5% oxygen at temperatures of from 20° to 60° C. for a period of time sufficient to obtain a pigment particle size form greater than 0.1 µm, and isolating the magenta beta phase quinacridone.

2. The process of claim 1, wherein said alcohol is methanol or ethanol.

3. The process of claim 1, wherein said base is an sodium hydroxide.

4. The process of claim 1, wherein said base is potassium.

5. The process of claim 1, wherein said alcohol is methanol and said base is sodium hydroxide.

6. The process of claim 1, wherein said oxidizing agent is an organic peroxide, hydrogen peroxide, air or another nitrogen/oxygen gas mixture containing at least 5%, by weight, of oxygen.

7. The process of claim 6, wherein said oxidizing agent is hydrogen peroxide, air or the nitrogen/oxygen mixture.

8. The process of claim 1, wherein said exposure to the oxidizing agent is conducted at a temperature of 40°-50° C. for a period of 4-50 hours.

9. The process of claim 1 for preparing a magenta beta crystal phase quinacridone having C.I.E. values in the masstone of L=34-36, A=36-38 and B=9—12.

10. The process of claim 1 for preparing a magenta beta crystal phase quinacridone having C.I.E. values in the masstone of L=35-36, A=36-38 and B=9-11.

* * * * *